(12) United States Patent
Gateva et al.

(10) Patent No.: US 7,672,317 B2
(45) Date of Patent: Mar. 2, 2010

(54) METHOD, SYSTEM, AND DEVICES FOR TRANSMITTING INFORMATION BETWEEN A USER EQUIPMENT AND AN IP PACKET GATEWAY

(75) Inventors: Ralitsa Gateva, Kirkland, WA (US); Thinh Nguyen Phu, Southlake, TX (US)

(73) Assignee: Nokia Corporation, Espoo (FI)

( * ) Notice: Subject to any disclaimer, the term of this patent is extended or adjusted under 35 U.S.C. 154(b) by 1316 days.

(21) Appl. No.: 10/795,230

(22) Filed: Mar. 9, 2004

(65) Prior Publication Data
US 2005/0141527 A1 Jun. 30, 2005

Related U.S. Application Data

(60) Provisional application No. 60/532,634, filed on Dec. 29, 2003.

(51) Int. Cl.
*H04L 12/28* (2006.01)
*H04M 1/66* (2006.01)
(52) U.S. Cl. ........................................ 370/401; 455/411
(58) Field of Classification Search ................. 370/320, 370/335, 342, 441, 230.1, 395.1, 229, 389, 370/466, 235, 338, 340, 331, 401; 455/333, 455/411, 452.2, 410, 435.1; 705/67; 709/227
See application file for complete search history.

(56) References Cited

U.S. PATENT DOCUMENTS

| 6,912,214 B2* | 6/2005 | Madour et al. ............. 370/340 |
|---|---|---|
| 2002/0034939 A1* | 3/2002 | Wenzel ....................... 455/411 |
| 2002/0036983 A1* | 3/2002 | Widegren et al. ........ 370/230.1 |
| 2002/0042821 A1 | 4/2002 | Muret et al. ................. 709/223 |
| 2002/0136390 A1 | 9/2002 | Lang et al. ................... 379/222 |
| 2002/0194140 A1* | 12/2002 | Makuck ........................ 705/67 |
| 2004/0047366 A1* | 3/2004 | Chowdhury ................ 370/466 |
| 2004/0190453 A1* | 9/2004 | Rasanen et al. ............. 370/235 |
| 2004/0205193 A1* | 10/2004 | Hurtta et al. ................. 709/227 |
| 2004/0259562 A1* | 12/2004 | Madour .................... 455/452.2 |
| 2005/0003798 A1* | 1/2005 | Jones et al. ................. 455/410 |
| 2005/0007984 A1* | 1/2005 | Shaheen et al. ............. 370/338 |
| 2005/0075107 A1* | 4/2005 | Wang et al. ............... 455/435.1 |

(Continued)

OTHER PUBLICATIONS

3GPP TS 29.207 V5.5.1 (2003-10), $3^{rd}$ Generation Partnership Project; Technical Specification Group-Core Network; Policy Control Over GO Interference (Release 5).

*Primary Examiner*—Aung S Moe
*Assistant Examiner*—Awet Haile
(74) *Attorney, Agent, or Firm*—Harrington & Smith

(57) ABSTRACT

A method, a system, and network elements for transmitting information between a user equipment and an IP packet gateway, are disclosed, the IP packet gateway communicating with an IP network via an interface, wherein, when the UE is requesting at least one service requiring access to the IP network, authorization of the requested service is checked, wherein an error message is sent from the IP packet gateway to the user equipment, when the requested service is not authorized. The present invention discloses several options of signaling error messages between IP packet gateway and UE, for example, via IP layer signaling (e.g. RESV ERR messages) or link layer signaling (e.g. IS2000 and IOS signaling). The solution according to the present invention, in particular, relates to a CDMA network in connection with an IP multimedia subsystem network.

47 Claims, 5 Drawing Sheets

U.S. PATENT DOCUMENTS

2005/0195787 A1* 9/2005 Madour et al. .............. 370/338
2006/0165038 A1* 7/2006 Abrol et al. ................. 370/331
2006/0256719 A1* 11/2006 Hsu et al. ................... 370/230

* cited by examiner

METHOD, SYSTEM, AND DEVICES FOR TRANSMITTING INFORMATION BETWEEN A USER EQUIPMENT AND AN IP PACKET GATEWAY

CROSS REFERENCE TO RELATED APPLICATIONS

This application claims priority from U.S. Provisional Patent Application Ser. No. 60/532,634, entitled "Method, System, and Devices for Transmitting Information Between a User Equipment and An IP Gateway" and filed on Dec. 29, 2003. The contents of the provisional application are hereby incorporated in their entirety by reference.

FIELD OF THE INVENTION

The present invention relates to a method, system, and devices, such as network nodes, for transmitting information between a user equipment, e.g. UE or MS, and an IP packet gateway, e.g. a Packet Data Serving Node, PDSN, and relates in particular to such a transmitting in connection with an IP multimedia network within a CDMA network environment.

BACKGROUND OF THE INVENTION

In recent years, both the amount of required communications as well as the requirements on communications increased significantly. In particular, mobile communications systems such as Global System for Mobile Communication (GSM) and packet data networks such as the Internet are concerned with this development. As an example, packet-switched mobile communication systems such as Code Division Multiple Access (CDMA) networks have been introduced.

It is to be noted that many of the aspects discussed in the following relating to CDMA networks are only intended to be illustrative and exemplary for all kinds of comparable Third Generation (3G) networks, e.g. Universal Mobile Telecommunications System (UMTS) or General Packet Radio Service (GPRS).

An IP Multimedia Subsystem (IMS) provides for handling multimedia applications (e.g. still and moving images).

After an establishment of a session between e.g. a user equipment and a network element, a policy often has to be defined for the established communication session. A session can be understood as a logical/virtual connection and is to be established in the beginning of user activity. Such policy specifies communication requirements related to the respective session, e.g. the required quality of service (QoS) for the data packets to be transmitted, or required security aspects. Usually, specialized functions and/or network elements are provided for policy-related purposes.

Errors occurring during policy control are usually handled by network elements. For this purpose, predetermined error codes may be used in order to identify the type of error and to choose a procedure for handling it.

SUMMARY OF THE INVENTION

It is an object of the present invention to provide a method, system and devices for exchanging information relating to intra-network policy control between a user equipment and a serving node of a packet-switched network.

According to a first aspect of the present invention a method is provided for transmitting information between a user equipment and an IP packet gateway, the an IP packet gateway communicating with an IP network via an interface, wherein, when the user equipment is requesting at least one service requiring access to the IP network, authorization of the requested service is checked, wherein an error message is sent from the an IP packet gateway to the user equipment, when the requested service is not authorized.

According to further advantageous optional aspects:
the IP packet gateway is a packet data serving node, PDSN,
the IP network is an IP multimedia subsystem network,
the IP packet gateway is a network element of a CDMA network,
the interface is a policy control interface,
the interface is the 3GPP Go interface,
the checking of authorization of the requested service is performed by a policy decision function,
the error message is transmitted by means of IP layer signaling,
the error message is transmitted by means of link layer signaling,
the link layer signaling is an IS2000/IOS signaling,
the transmitted information relates to policy control and/or roaming information over said interface,
the error message is of a type according to the RSVP protocol,
the method comprises a step of generating a reservation message at the user equipment for requesting authorization for at least one service,
the reservation message contains identifiers of the services for which authorization is requested and for each requested service a set of binding information defining attributes being associated with the respective service,
each set of binding information is bundled with the respective requested service,
the method further comprises a step of transmitting a message generated by said user equipment from said user equipment to the IP packet gateway,
the method further comprises a step of analyzing a message, which is transmitted from the user equipment to the IP packet gateway, in the IP packet gateway in terms of requested services,
the checking comprises a step of determining in the IP packet gateway, whether the requested services are to be authorized in accordance with information from said IP network,
the method further comprises a step of generating the error message for indicating the user equipment an error regarding a rejection of authorization of at least one of the requested services in the IP packet gateway,
the error message contains the at least one identifier of the unauthorized services, a respective set of binding information defining attributes being associated with the requested service, and a respective error code,
a step of generating an error message further comprises a step of detecting a reason for a rejection of authorization for the respective service and a step of obtaining an appropriate error code for an unauthorized service based on the detected reason for rejection from the IP network,
the method further comprises a step of generating an update message, when said user equipment received an error message from the IP packet gateway, for requesting authorization for the previously unauthorized services,
the update message contains all identifier of previously unauthorized services and a set of binding information defining new attributes associated with the respective requested services,
each set of binding information is bundled with the respective requested service, the step of generating an update message further comprises a step of checking the received error message in terms of error code and a step of identifying a new set of binding information for previously unauthorized services based on the received error code, the method, when said determining yields that at least one of the requested services is to be authorized, said method further comprising a steps of generating a confirmation message for confirming authorization to the user equipment, and a step of transmitting said confirmation message from the IP packet gateway to the user equipment, the confirmation message contains identifiers of the authorized services, the confirmation message further contains respective sets of binding information of the authorized services, the reservation message contains information on quality of service for at least one of the requested services, the information on quality of service is bundled with an identifier of the respective service and with a respective set of binding information, the information on quality of service is Differentiated Services Code Point and bit rate, a set of binding information defining attributes for a requested service consists of an authorization token for ensuring an unique assignment of a request to a respective authorization operation and flow identifiers of flows being carried by a used packet data protocol, the method comprises an initiation of a packet data service instance clearing procedure by the IP packet gateway, the initiation is indicated to a base station by means of a reject code, the base station returns a failure indication to a mobile switching center, the mobile switching center, in response to said failure indication, releases an existing call or initiates negotiation with respect to the call.

According to a second aspect of the present invention a system is provided for transmitting information between a user equipment and an IP packet gateway, the IP packet gateway communicating with an IP network via an interface, wherein, when the user equipment is requesting at least one service requiring access to the IP network, authorization of the requested service is checked, wherein an error message is sent from the IP packet gateway to the user equipment, when the requested service is not authorized.

According to further advantageous optional aspects:
the IP packet gateway is a packet data serving node, PDSN,
the IP network is an IP multimedia subsystem network,
the IP packet gateway is a network element of a CDMA network,
the interface is a policy control interface,
the interface is the 3GPP Go interface,
the system comprises the user equipment and the IP packet gateway, According to a third aspect of the present invention a user equipment to be used in a method according to anyone of the preceding method aspects, or in a system according to anyone of the preceding system aspects is provided for transmitting information between the user equipment and an IP packet gateway, the IP packet gateway communicating with an IP network via an interface, wherein the user equipment is adapted to request at least one service requiring access to the IP network, and is adapted to receive an error message sent from the IP packet gateway to the user equipment, when a check of authorization of the requested service indicates that the requested service is not authorized.

According to further advantageous optional aspects:
the IP packet gateway is a packet data serving node, PDSN,
the user equipment comprises message generating means which are adapted to generate reservation messages and update messages,
the user equipment comprises analyzing means which are adapted to analyze messages received from the IP packet gateway,
the user equipment comprises processing means which are adapted to process messages received from the IP packet gateway in accordance with a analyzing result from said analyzing means,
the message generating means operate in accordance with a processing result from said processing means,
the user equipment comprises transmitting/receiving means which are adapted to transmit messages being generated in the user equipment to the IP packet gateway and to receive messages from the IP packet gateway.

According to a fourth aspect of the present invention an IP packet gateway is provided for transmitting information between a user equipment and the IP packet gateway, the IP packet gateway being adapted to communicate with an IP network via an interface, wherein the IP packet gateway is adapted to check, when the user equipment is requesting at least one service requiring access to the IP network, authorization of the requested service, and wherein the IP packet gateway is adapted to send an error message to the user equipment, when the requested service is not authorized.

According to further advantageous optional aspects:
the IP packet gateway is a packet data serving node, PDSN,
the packet data serving node comprises message generating means which are adapted to generate error messages and confirmation messages,
the packet data serving node comprises determining means which are adapted to determine, whether a requested service is to be authorized in accordance with information from said IP network,
the message generating means operate in accordance with a determining result from the determining means and error code information from said IP network,
the packet data serving node comprises transmitting/receiving means which are adapted to transmit messages being generated in the IP packet gateway to the user equipment and to receive messages from the user equipment,
the packet data serving node comprises analyzing means which are adapted to analyze messages received from the user equipment in terms of requested services.

According to one aspect of the invention, IMS deployment, especially for CDMA environments, is possible so as to provide IMS functionality within CDMA networks.

In accordance with one or more of preferred embodiments of the invention, an occurrence of an error, e.g. in CDMA networks, can be signaled to other network nodes, e.g. a user equipment, which are remote to a respective interface. The user equipment is thus informed about errors concerning policy control related to itself, and can also be involved in error handling procedures. Thus, it is an advantage that the error information exchange regarding a policy control interface such as the Go interface or any other comparable interface can be transported from the IP packet gateway to the mobile user.

Up to now, there was no mechanism for exchanging error information regarding this interface from an IP packet gateway to a user equipment.

Especially in a CDMA network environment with a connected IP network, e.g. an IP multimedia system, it is of advantage to exchange error information regarding the interface in-between the two networks from an IP packet gateway to a user equipment.

In accordance with a preferred implementation of the present invention, steps or means are provided for transporting error information exchange regarding a policy control interface such as the Go interface from an IP packet gateway to a mobile user UE.

It is an advantage of the present invention that several options of signaling error messages between an IP packet gateway and an UE are provided. The error messages may preferably be transported via IP layer signaling (e.g. RESV ERR messages) or link layer signaling (e.g. IS2000 and IOS signaling).

Further, it is an advantage of the present invention that, although directed to all kinds of 3G networks, it fits into the current 3GPP specification on policy control and that no changes to the 3GPP Go specification is needed for implementing the present invention in an environment according to 3GPP specifications. Especially, known policy decision functionalities and the related Go interface procedures as well as already specified error codes for the Go interface can be reused. Thus, it is possible to implement the Go interface in CDMA environments.

In addition, implementations of the invention are transparent to the 3GPP2 radio access network. Thus, there exists no impact to the Interoperability Standard (IOS) specification.

It is a further advantage of the present invention that it enables an implementation of the Go interface functionality known from 3GPP for CDMA-based systems. Thereby, the present invention provides an advantageous approach for converging different networking concepts, i.e. 3GPP networks and CDMA networks, in connection with error handling concerned with policy control operations.

BRIEF DESCRIPTION OF THE DRAWINGS

In the following, the present invention will be described in greater detail with reference to preferred embodiments of the present invention and the accompanying drawings.

DETAILED DESCRIPTION OF PREFERRED EMBODIMENTS OF THE PRESENT INVENTION

It is to be noted that the present invention will be described with a specific focus on an IP multimedia system (IMS) deployment in connection with a CDMA network environment. However, it is to be understood that the present invention is not limited to such a scenario but can also be applied in similar environments of 3G networks such as UMTS or GPRS, as well as in connection with other types of IP-based networks. Thus, also the interface which is mainly referred to in the following may be a different interface, preferably having a functionality similar or comparable to the below described interface.

An IP packet gateway as disclosed above is generally of a type of network node which is a serving node for packet data in a packet-switched network such as a CDMA network. In the following, for the sake of simplicity, it will mainly be referred to a packet data serving node, PDSN, as an example for such an IP packet gateway. However, any other node with a similar serving functionality for packet data can be used.

Figure 1:
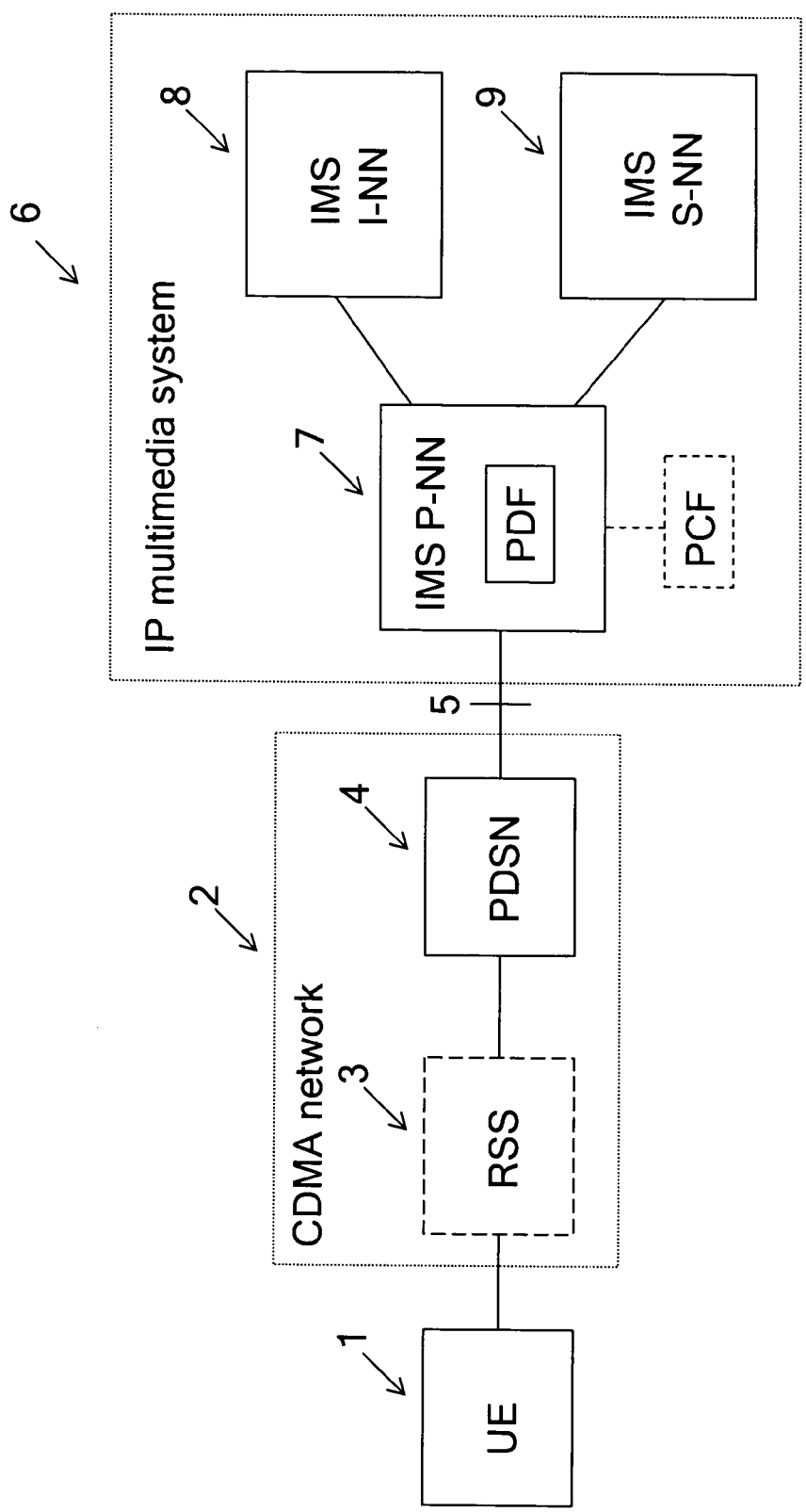
FIG. 1 shows a block diagram illustrating a schematic topology of networks to which the present invention can be applied.

FIG. 1 shows a block diagram illustrating a schematic topology of networks to which the present invention can be applied.

In FIG. 1, a user equipment, UE, 1 is shown which may also be a mobile or stationary station MS. The user, or more precisely the user equipment UE or mobile station MS, is connected to a CDMA network 2 which is indicated by a dotted block. In detail, the UE is connected to a subsystem RSS 3 within the CDMA network 2, which subsystem RSS 3 performs radio functions and enables the UE 1 to connect wireless to the CDMA network 2. Via this subsystem RSS 3, the UE 1 is connected to a packet data serving node PDSN 4 exemplifying an IP packet gateway, which in this example is a part of the CDMA network 2. The PDSN 4 cares about handling of packet data within the CDMA network 2 and to/from the outside. In order to account for policies applying to such packet data, a function performing policy enforcement may also be incorporated into the PDSN 4.

In FIG. 1, it is shown that the PDSN 4 is located at an interface 5 between the CDMA network 2 as such and a second type of network 6 which is indicated by another dotted block. In this example, the second type of network is an IP multimedia system providing multimedia services. These multimedia services are carried by media flows and their characteristics (e.g. media type, format, IP address, port, transport protocol, bandwidth) are defined by media components. When the UE 1 requests a service from the second network 6, the UE is required to access to the second (IP) network 6 over the interface 5 between the PDSN 4 of the CDMA network 2 and the second (IP) network 6.

It is this interface 5 where corresponding procedures for accessing the second network and for policy control for requested services may take place. In 3GPP standardization, for example, a comparable interface and respective procedures are specified, and the interface is known as Go interface. Any other policy control interface with similar functionality can also be applied here.

As an example, three network nodes of the second (IP) network 6 are shown in FIG. 1. An network node denoted by IMS P-NN 7 is located at the edge of the IP network and, hence, builds a gateway to/from other networks, e.g. the CDMA network 2. The IMS P-NN 7 behaves like a proxy network node, i.e. it accepts requests and services them internally or forwards them on. The IMS P-NN 7 may include a function performing policy decision denoted by PDF (policy decision function). Another function, namely a function performing policy control denoted by PCF (policy control function) can be provided which may e.g. be connected to the IMS P-NN 7. Both functions are to be understood as logical entities. The policy decision function provides session management services, decides about policies to be applied to media flows, and notifies other network nodes being involved in packet data handling, e.g. the PDSN 4 of the CDMA network 2, about valid policies. The PDF may be controlled by the PCF. Two other types of network nodes of the IP network are also shown, which are connected to the IMS P-NN 7. These are an interrogating network node IMS I-NN 8 which is the contact point within an operator's network and a serving network node IMS S-NN 9 which performs the session control services for user of the IP network 6.

A first embodiment of the present invention will be explained in the following. This embodiment is exemplarily described in connection with signaling on the IP layer of the used packet data protocol stack.

The following description is based on a usage of predetermined message formats according to the Resource Reservation Protocol RSVP for messages being exchanged between a user equipment UE 1 and a packet data serving node PDSN 4. However, this only serves as an illustrative example and it is also conceivable that another protocol type being applicable on the IP layer can be used for this purpose.

Figure 2:
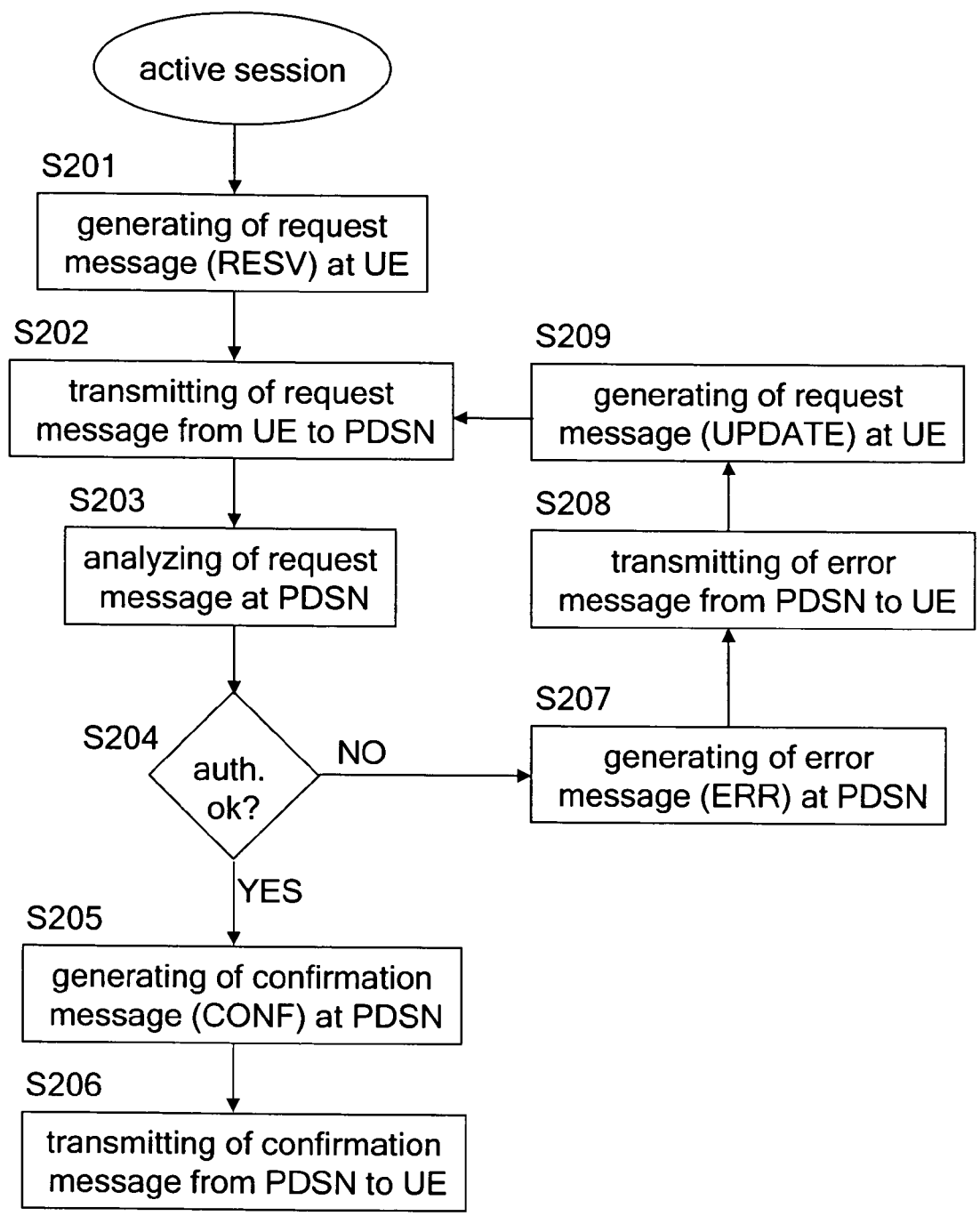
FIG. 2 shows a flow diagram of a method according to a first embodiment of the present invention.

FIG. 2 shows a flow diagram of a method according to a first embodiment of the present invention.

Before being able to transmit information between a user equipment UE and a packet data service node PDSN, a communication session as mentioned above has to be established. Such a session can be e.g. a multimedia session according to an IP multimedia subsystem IMS or a multimedia session according to the real-time streaming protocol RTSP. Since procedures of session establishment are beyond the scope of the present invention, an established session will always be assumed to exist in the following.

In a multimedia session like one of the above mentioned, a connection between a UE and a PDSN used to transport user data for a packet data service is called a service instance. Associated with each service instance is a packet data service option, a service reference identifier (SR_ID), and an R-P connection. Two categories of service instances are defined, a main service instance and an auxiliary service instance. A service reference identifier (SR_ID) is a unique number assigned to each connected service option instance. A service instance carries media flows for conveying user data related to a respective media in said multimedia environment.

After initialization of a session between a user equipment UE and a packet data service node PDSN, a user equipment may request a service and, thus, require access to an IP network like the one according to FIG. 1. In order to request approval/authorization for a requested service, the UE generates a request message in step S201. In this step, the mobile user can generate a RESV message, which is a reservation message, for several service instances carrying media flows that will be created at the same time based on the active IMS/TSP session. The mobile user should include related sets of binding information, i.e. token and flow ids, with the relevant SR_IDs. The token and flow ids can be bundled with the relevant service instance identifier (SR_ID). Thereby, a set of binding information specifies attributes associated to a respective service or service instance.

A set of binding information consists of an authorization token and the flow identifier/identifiers of carried IP (media) flows. An authorization token may consist of an IMS session identifier and a PDF identifier, and it may be used for approving/authorizing a quality of service (QoS) for IP flows. An IP flow is a unidirectional flow of IP packets with the same source IP address and port number and the same destination IP address and port number and the same transport protocol.

In step S202, the generated request message is transmitted from the UE to the PDSN. At the PDSN, the request message being transmitted in step S202 is analyzed in step S203 in terms of requested services and/or service instances. In step S204, the PDSN determines, whether the requested services or service instances are to be approved/authorized in accordance with (policy) information from the IP network from which services are requested. Such a checking of approval/authorization may also take place in a policy decision function.

When the determining of step S204 yields that at least one of the requested services is to be approved, the PDSN continues, in step S205, with generating a confirmation message for confirming approval to the UE. This message may, according to the present example, be of a reservation confirmation (RESV CONF) type. Subsequently, in step S206, the PDSN sends back the RESV CONF message to the UE. Included in an RESV Confirm object of this message, the authorized/approved sets of binding information with the relevant SR_IDs or only the relevant SR_IDs may be found.

However, it may be the case that a certain binding set with a certain service instance (SR_ID) is not approved in step S204. In this case, an error message is generated at the PDSN in step S207, which message may be of a reservation error type (RESV ERR). This error message is intended to indicate the user equipment UE an error regarding a rejection of approval of at least one of the requested service or service instances. The PDSN should also be able to use the RESV ERR message to the mobile user for indicating errors regarding policy control authorization.

The error message should contain the identifier of the at least one unapproved service or service instance, respective sets of binding information belonging to each of the unapproved services or service instances, and an error code. The error codes should be bind with a certain binding information (i.e. token and flow ids) with the service instance identifier (SR_ID). As error codes, error codes being available on the above mentioned interface should be used. As an example, such relevant error codes are listed in Annex D of the 3GPP specification document 3GPP TS29.207.

Therefore, an "Authorization error" IE pointing the relevant SR_ID is included in the RESV Error message, e.g. under the 3GPP Object or traffic flow template (TFT) Error. The error codes from TS29.207 Annex D shall be listed in this IE.

In step S208, the PDSN sends back the RESV ERR message with the relevant error code for this specific service instance to the UE. In the UE, generating of an updated request message is performed in step S209. The processing of step S209 may include a checking of the received error code message in terms of error code and unapproved service/services, and a step of identifying a new set of binding information based on the received error code. The generated update (RESV) message may contain all identifiers of the previously unapproved services and a set of binding information defining new attributes associated with the newly requested services.

Additionally, the mobile user can send the update RESV messages (as e.g. changes of the IMS session, media changes, QoS changes) to the PDSN by reusing step S202 since the update RESV message is logically comparable the former request message. The update RESV message will carry information about the same SR_ID but the binding set can be changed (e.g. new flow ids or old flow id is removed) as described above. Subsequently, the procedure continues with the following steps, i.e. S204 to S209, as long as all requested services are approved or it is abandoned to obtain approval for a certain service. In this connection, it is conceivable that the UE stops requiring approval for a certain service, when a predetermined number of approval rejections by the PDSN took place or due to some other event.

It is also conceivable that the RESV message may carry QoS information as is known from approaches of the Internet Engineering Task Force (IETF). In this case, it is proposed that the QoS information to be Differentiated Service Code Point (DSCP) and bit rate. The QoS should be bundled with an SR_ID and the relevant binding information sets (i.e. token and flow ids). This is needed as the QoS for a service instance can be reflected in the changing of the user for this service instance. Therefore, the QoS information should be carried in the 3GPP2 object as regards an implementation of the present invention in an 3GPP environment.

Further, it is conceivable that the mobile user UE wildcards or does not send at all any information as part of Packet filters in the 3GPP2 Object, when sending the sets of binding information (i.e. token and flow ids) for the SR_ID. This is because the packet filters information may come via the (policy control) interface, e.g. the Go interface, as part of the decision of the policy decision function (PDF).

Figures 3A, 3B:
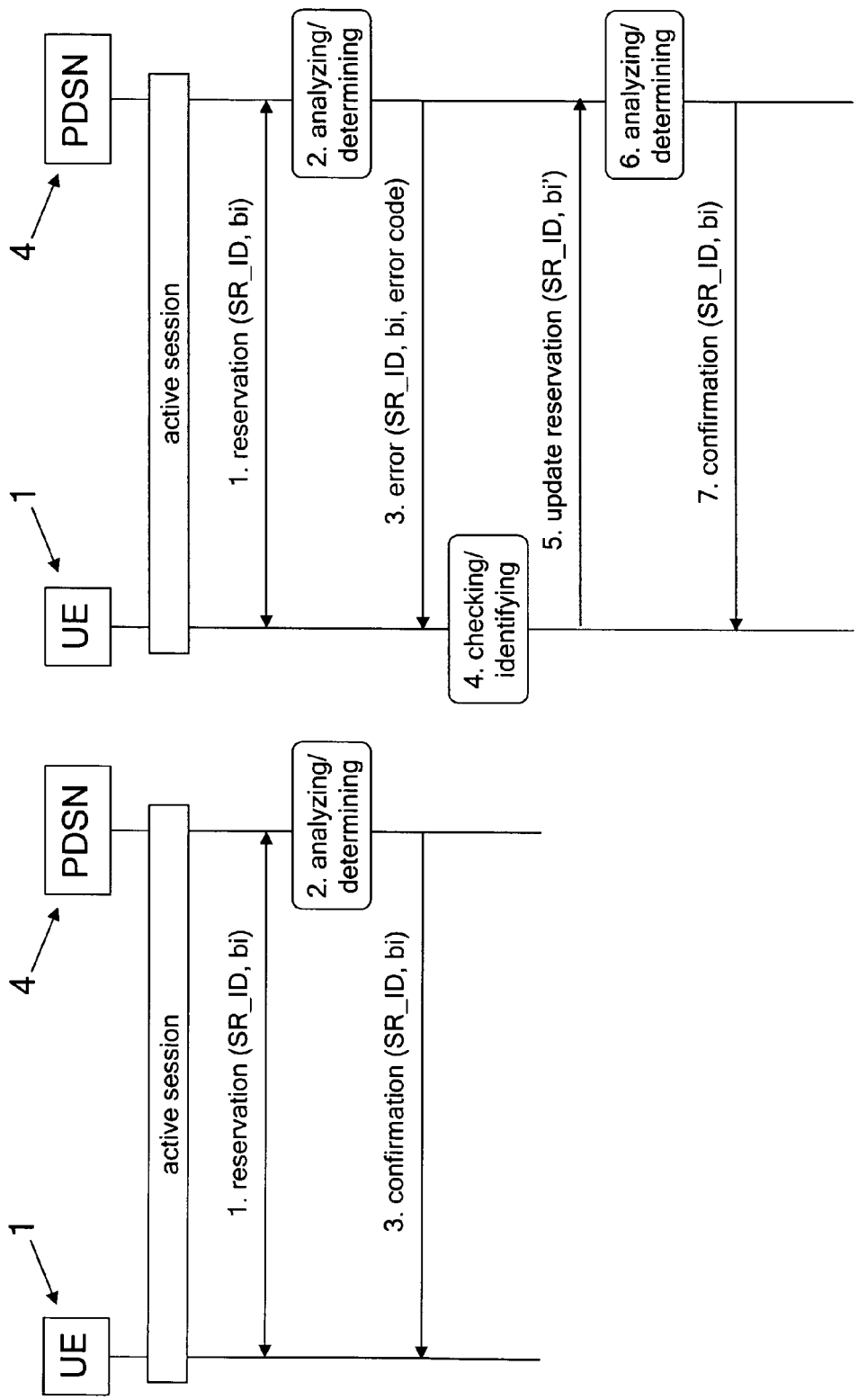
FIGS. 3A and 3B illustrate two examples of information flow diagrams of messages according to the method of the first embodiment.

FIGS. 3A and 3B illustrate two examples of information flow diagrams of messages according to the method of the first embodiment.

In FIG. 3A, an example is shown where the requested service is approved/authorized by the PDSN 4 at first go. After activation of a session, for example, the UE 1 first sends a reservation message to the PDSN 4. The message may be of a RESV message type and contains the service instance identifier SR_ID of the requested service and a set of binding information being denoted by bi. The sending corresponds to step S202 of FIG. 2. According to steps S203 and S204 of FIG. 2, the PDSN analyzes the received reservation message and determines, whether the requested service is to be approved or not. In this example, the requested service is approved and the UE is notified about this result by a confirmation (RESV CONF) message sent by the PDSN to the UE. This message contains the approved service instance identifier (SR_ID) and the respective set of binding information. Therewith, the procedure is completed and the UE can use the media flows carried by the approved service instance for accessing the IP network and for utilizing services of the IP network, e.g. media applications.

Another example is shown in FIG. 3B. In this example, the approval/authorization does not proceed smoothly according to FIG. 3A. The first two phases, i.e. sending of reservation message and analyzing/determining, of the information flow are equivalent to FIG. 3A, as an example. However, the result of determining is negative and, thus an error (RESV ERR) message with the relevant SR_ID, the respective set of binding information, and an error code is sent to the UE (cf. step S208 of FIG. 2). According to step S209 of FIG. 1, the UE checks the received error message in terms of unapproved services and error codes, identifies a new binding set (bi') for each of the previously unapproved services, generates a corresponding update reservation (UPDATE) message, and send this UPDATE message to the PDSN. At the PDSN, a new analyzing/determining process takes place. This time, a positive result of determining is obtained, i.e. the service instance can be approved in connection with the modified set of binding information (bi'). A confirmation message is then sent to the UE and, therewith, the procedure is completed and the UE can use the media flows carried by the approved service instance for accessing the IP network and for utilizing services of the IP network, e.g. media applications.

From the above description and the corresponding information flow diagrams, it can clearly be gathered that the information exchange between the user equipment and the IP packet gateway, e.g. the packet data serving node, takes place in a bidirectional fashion. Thus, the direction of the shown messages is to be understood to be exemplary as the concept of the invention is to be understood as fully bidirectional. For example, the concept does not restrict the PDSN or network system to send reservation information to the mobile UE. Hence, it is conceivable that the direction of any message can be different for special cases. Also, the processing of respective messages is not restricted to be exclusively at that side of the communication where it is exemplarily shown in FIGS. 3A and 3B.

After having explained the method according to a first embodiment of the present invention, respective system aspects according to a second embodiment will be described in the following. The below apparatuses and means are especially adapted for being able to perform the needed functions according to the respective method described above.

Figure 4:
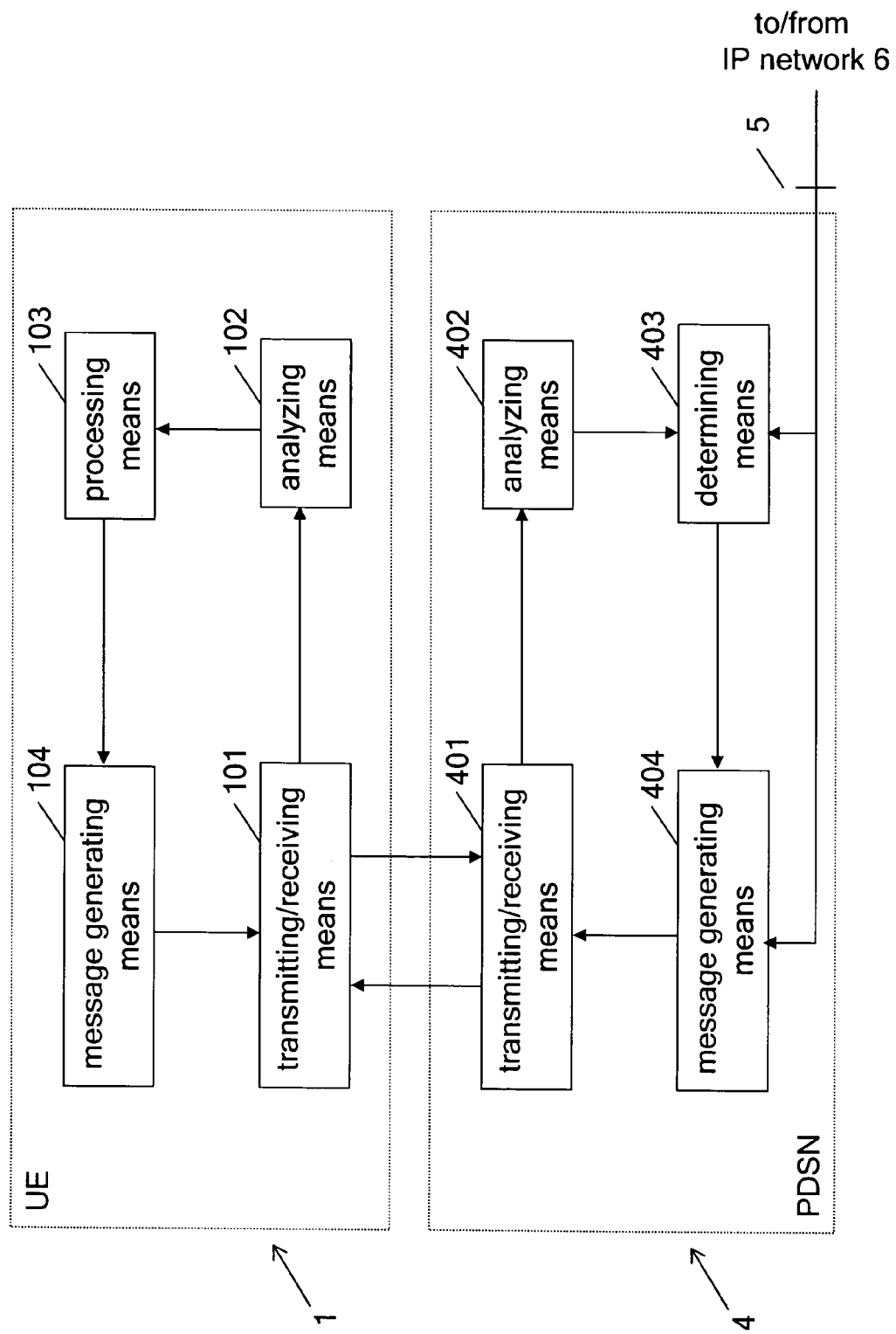
FIG. 4 shows a block diagram of a schematic structure of a user equipment and a packet data serving node according to a second embodiment of the invention, usable for implementing the method according to the first embodiment.

FIG. 4 shows a block diagram of a schematic structure of a user equipment and a packet data serving node according to a second embodiment of the invention, usable for implementing the method according to the first embodiment. A system according to the present invention would preferably consist of at least one such user equipment and at least one such packet data serving node.

In FIG. 4, a user equipment UE 1 according to the second embodiment of the present invention consists of transmitting/receiving means 101, analyzing means 102, processing means 103, and message generating means 104. The transmitting/receiving means 101 form a message input/output means of the UE 1. On the one hand, they transmit messages which are generated in the UE 1 to a network node connected to the UE 1, in this case a packet data serving node PDSN 4. On the other hand, they receive messages from a network node connected to the UE 1, in this case a packet data serving node PDSN 4, which are destined for the UE 1. The transmitting/receiving means 101 forward the received messages to the analyzing means 102, where the messages are analyzed in terms of their type, e.g. error message or confirmation message, and their contents, e.g. error code.

A result of the analyzing means 102 is transferred to the processing means 103 which process the messages on the basis of the analyzing result. In case of a confirmation message, the processing means 103 enable the UE 1 to use the media flows carried by the approved service instance for accessing the IP network and for utilizing services of the IP network, e.g. media applications. In case of an error message, the processing means 103 check the error code/codes of the contained service instance/instances and identifies a new set of binding information for each previously unapproved service instance based on the corresponding error code. The message generating means 104 generate either generate reservation messages or, based on the results of the processing means 103, reservation update messages, and forward them to the transmitting/receiving means 101.

A packet data serving node according to the second embodiment of the present invention is shown in FIG. 4 to consist of a transmitting/receiving means 401, an analyzing means 402, a determining means 403, a message generating means 404 and an interface 5 to an IP network 6, which provides for e.g. multimedia services.

The transmitting/receiving means 401 form a message input/output means of the PDSN 4. On the one hand, they transmit messages which are generated in the PDSN 4 to a network node connected to the PDSN, in this case a user equipment UE 1. On the other hand, they receive messages from a network node connected to the PDSN, in this case a user equipment UE 1, which are destined for the PDSN 4. The transmitting/receiving means 401 forward the received messages to the analyzing means 402, where the messages are analyzed in terms of their type, e.g. reservation message or update message, and their contents, e.g. requested services and binding sets.

A result of the analyzing means 402 is transferred to the determining means 403 where it is determined, whether a requested service is to be approved/authorized or not. This determining is performed on the basis of information, e.g. policy information, is obtained via the above mentioned interface 5 from the IP network 6. The result of the determining is then transferred to the message generating means 404. The message generating means 404 generate either generate confirmation messages or, based on the results of the processing means 403, error messages into which error codes obtained from the IP network 6 via said interface 5 are included. The messages are then forwarded to the transmitting/receiving means of the PDSN 401.

A third embodiment of the present invention will be explained in the following. This embodiment is exemplarily described in connection with signaling on the link layer of the used packet data protocol stack. It thus refers e.g. to IS2000 and IOS signaling. IOS stands for the cdma2000 Interoperability standard.

Basically, the third embodiment refers to the same scenario as the first and second embodiments. Therefore, it is not described in such a detailed manner compared to the description of the first embodiment. However, it is to be noted that the implementation of the method of the third embodiment refers to the link layer and, thus, is to be understood as alternative to a possible implementation of the IP layer method according to the first embodiment.

Figure 5:
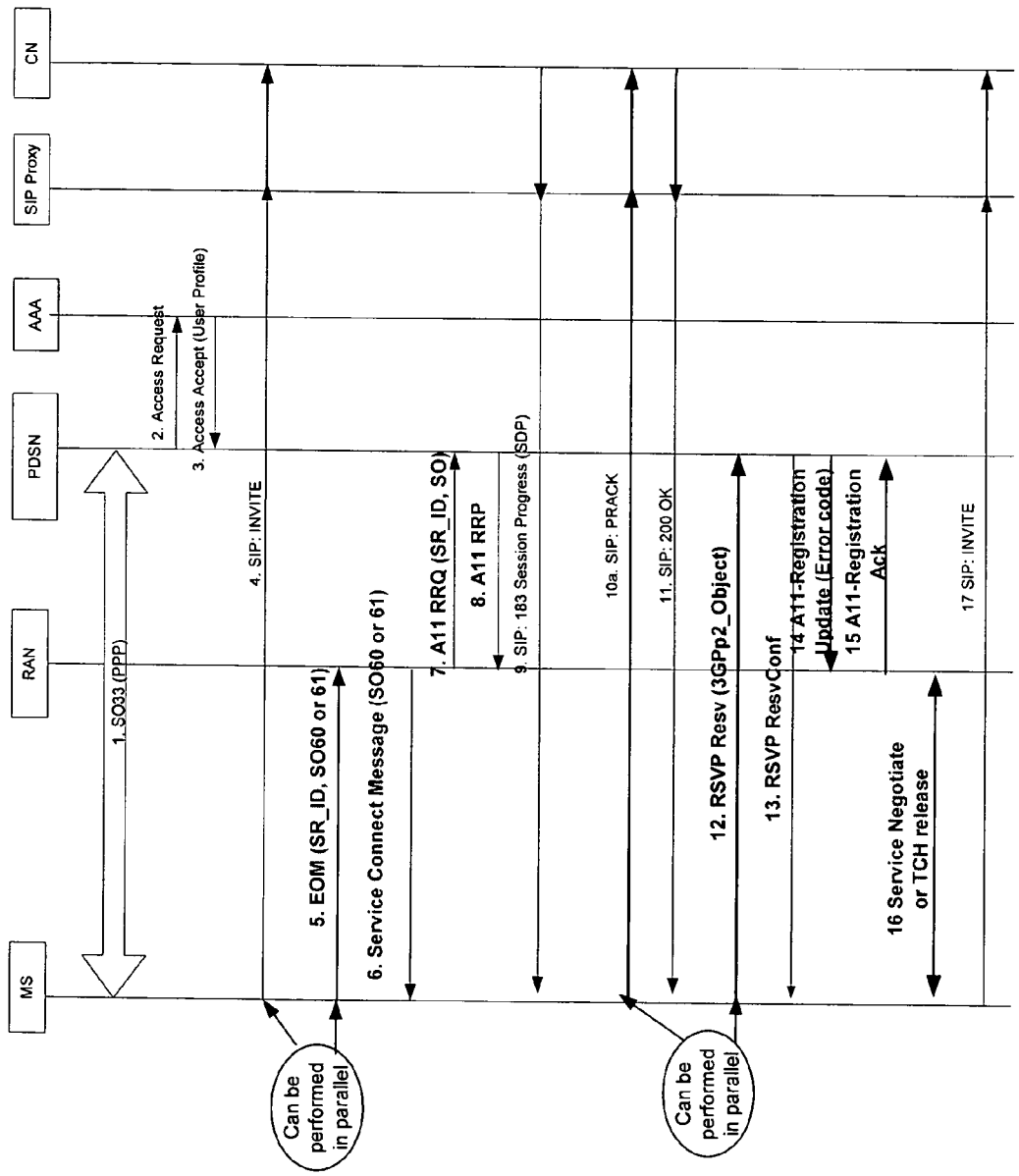
FIG. 5 shows an information flow diagram of messages of a method according to a third embodiment of the present invention.

FIG. 5 shows an information flow diagram of messages of a method according to a third embodiment of the present invention. The message flow also shows an example of the error codes that are sent back via the link layer.

In FIG. 5, the involved entities are a mobile station MS being equivalent to the above user equipment UE, a radio access network RAN, a packet data serving node PDSN also being equivalent to the above PDSN, an AAA entity being concerned with authorization, authentication and accounting, a SIP proxy being an entity handling Session Initiation Protocol processes, and a core network CN.

Firstly, a point-to-point (PPP) connection according to cdma2000 packet data service option S033 is established between the MS and the PDSN. The PDSN sends an Access Request message to the AAA entity, from which it receives an Access Accept message which contains a specification of the accepted user profile. Next (in phase 4), an INVITE message of the Session Initiation Protocol (SIP) is put through to the SIP proxy node, and from there to the core network. Subsequently or in parallel to the above INVITE message, an end-of-message (EOM) segment unit is transmitted from the SM to the radio access network RAN. The EOM contains a service instance identifier (SR_ID) and either service option S060, i.e. header removal, or service option S061, i.e. robust header compression. In phase 6, a service connect message containing S060 or S061 with respect to the service instance identifier (SR_ID) of the EOM is transmitted from the RAN to the MS. The mobile IP registration is continued in phase 7 in that the RAN sends an A11 RRQ message to the PDSN, i.e. a registration request over the A11 interface between the packet control function and the PDSN, which includes the SR_ID and an appropriate service option. The PDSN responds with a registration response over the A11 interface, i.e. with an A11 RRP message, to the RAN. In phase 9, a SIP session progress message according to the Session Description Protocol (SDP) originating at the CN is received at the SIP proxy and the MS. The MS responds with a SIP PRACK message to the SIP proxy and the CN for acknowledgment, and receives an SIP 200 OK message back. Therewith, a session establishment is completed.

In phase 12, the MS sends an RSVP Resv message including the 3GPP2_OBJECT: TFT IE, and policy information, etc. to the PDSN. The sending of this message in phase 12 is triggered by phase 9, and it can be performed in parallel with the sending of the message of phase 10a of FIG. 5. If the MS negotiates SDP in phase 10, the sending of the message in phase 12 can also be triggered by phase 11. In phase 13, the PDSN sends an RSVP ResvConf message to the MS. Additionally, the PDSN sends an registration update with a proper error code to the RAN and/or the PCF on the A10/11 interface (phase 14). Further, messages 13 and 14 can also be processed in parallel. Next, in phase 15, the RAN and/or PCF acknowledges receipt of the message of phase 14 by sending an registration acknowledgment Ack to the PDSN.

If the call is accepted, the MS and the Ran either negotiate a proper radio traffic channel or establish a pre-negotiated traffic channel. If the call is rejected, then traffic channel resources will be released. This procedure is indicted by the double arrow of phase 16 according to FIG. 5. Finally, the MS sends an SIP: Invite message to the SIP proxy and/or the CN (phase 17).

A mobile user can generate a RESV message for several service instances carrying media flows that will be created at same time based on the active IMS/RTSP sessions. The mobile user should include the related sets of binding information (i.e. token and flow ids) with the relevant service instance identifiers (SR_Ids). The token and flow ids are bundled with the relevant SR_ID (i.e. service instance identifier).

Now, or even in parallel with the above SIP PRACK message, the MS sends a reservation message like the one according to the first embodiment to the PDSN. This message may be of a RSVP RESV type with the mentioned SR_Ids included in the known 3GPP2 object.

The PDSN sends back a RESV CONF message including in the RESV Confirm object the authorized sets of binding information with the relevant SR_IDs or only the relevant SR_IDs. However, this case is not shown in FIG. 5.

It may also be the case that a certain binding set with the SR_ID (i.e. a certain service instance) is not authorized/approved at the PSDN. In this case the PDSN initiates Packet Data Service Instance-Clearing procedures with a reject code. In FIG. 5, this is shown in phase 14 by an A11 Registration Update message with an error code. As regards the obtaining and processing of the error code, the same as is described in connection with the first embodiment applies. That is, the error codes from Annex D of 3GPP specification TS29.207 shall be listed. Based on the reject/error code, the packet control function (PCF) of the RAN indicates this to a base station (BS) within the RAN, to which the mobile station MS is connected. The BS returns a failure indication to a respective mobile switching center (MSC), which, in-turn, releases or negotiates the call.

In FIG. 5, the RAN sends an A11 Registration Ack message to the PSDN for acknowledging receipt of the phase 14 message. Finally, in phase 16, either the call in form of an established traffic channel (TCH) is released, or a service negotiation between the MS and the Ran takes place. After that, the MS sends again a SIP INVITE message to the SIP proxy and to the core network.

Summarizing, in CDMA environments, in particular in cdma2000, there are two different levels of signaling: the signaling for the (policy control) interface between PDSN and IMS, e.g. the Go interface, is communicated on an independent layer, e.g. an RSVP layer, and the user traffic is transported on service instances. They are independent levels. The RSVP error message according to the present invention is not binded to any service instance. The message can carry different errors for e.g TFT error, header removal error or channel treatment error. The present invention provides, according to one of the preferred embodiments, a solution in that the RESV error message includes Go error codes from 3GPP TS29.207, when the Go error code needs to be communicated to the mobile user. The error code should be bind to a particular service instance identifier in the error message. On the other side, the user knows which service identifier is related to which token and flow identifiers as well.

In contrast thereto, in GPRS there is only one signaling involved, i.e. PDP context set-up. There is no need for mapping between the PDP context ID, token and flow Ids, and relevant error code. When there is a PDP context response from the network that the PDP context is rejected due to error, the PDP context by itself will carry the error code and the mobile user does not need to map anything between the error code, the PDP context ID, and the token and flow Ids, as the PDP context activation by itself carries all that. This would apply to 3GPP. Thus, there are no similarites of the present invention to "activate PDP context reject" in GPRS systems, when the binding information is not valid.

Even though the invention is described above with reference to the examples according to the accompanying drawings, it is clear that the invention is not restricted thereto. Rather, it is apparent to those skilled in the art that it can be modified in many ways without departing from the scope of the inventive idea as disclosed in the appended claims.

The invention claimed is:

1. A method, comprising:
   requesting, at least one service requiring access to an IP network, at an IP packet gateway communicating with the IP network via a policy control interface;
   analyzing, at the IP packet gateway, a message, which is received from a user equipment, in terms of requested services;
   checking, at the IP packet gateway, whether the requested service is authorized, said checking comprising determining, whether the requested services are to be authorized in accordance with information from said IP network;
   sending an error message from the IP packet gateway to the user equipment, when the requested service is not authorized, wherein at least one of the request or the error message includes at least one of policy control information and roaming information, wherein the error message contains at least one identifier of the unauthorized services, a respective set of binding information defining attributes being associated with the requested service, and a respective error code; and
   generating an update message, when said user equipment received an error message from the IP packet gateway, to request authorization for previously unauthorized services, wherein said update message contains an identifier of previously unauthorized services and a set of binding information defining new attributes associated with the respective requested services, wherein generating an update message further comprises checking the received error message in terms of error code and identifying a new set of binding information for previously unauthorized services based on the received error code.

2. A method according to claim 1, wherein the IP packet gateway is a packet data serving node.

3. A method according to claim 1, wherein the IP network is an IP multimedia subsystem network.

4. A method according to claim 1, wherein the IP packet gateway, is a network element of a code division multiple access network.

5. A method according to claim 1, wherein said policy control interface is $3^{rd}$ generation partnership project go interface.

6. A method according to claim 1, wherein the checking of authorization of the requested service is performed by a policy decision function.

7. A method according to claim 1, wherein the error message is transmitted by means of IP layer signaling.

8. A method according to claim 1, wherein the error message is transmitted by means of link layer signaling.

9. A method according to claim 8, wherein said link layer signaling is a code division multiple access 2000 interoperability standard signaling.

10. A method according to claim 1, wherein the error message is of a type according to a resource reservation protocol.

11. A method according to claim 1, further comprising:
    generating a reservation message at the user equipment for requesting authorization for at least one service.

12. A method according to claim 11, wherein said reservation message contains identifiers of the services for which authorization is requested and for each requested service a set of binding information defining attributes being associated with the respective service.

13. A method according to claim 12, wherein each set of binding information is bundled with the respective requested service.

14. A method according to claim 1, further comprising:
    transmitting a message generated by said user equipment from said user equipment to the IP packet gateway.

15. A method according to claim 1, further comprising:
    generating the error message to indicate the user equipment an error regarding a rejection of authorization of at least one of the requested services in the IP packet gateway.

16. A method according to claim 1, wherein generating an error message further comprises
    detecting a reason for a rejection of authorization for the respective service; and
    obtaining an appropriate error code for an unauthorized service based on the detected reason for rejection from the IP network.

17. A method according to claim 1, wherein each set of binding information is bundled with the respective requested service.

18. A method according to claim 1, wherein when said determining yields that at least one of the requested services is to be authorized, said method further comprising generating a confirmation message for confirming authorization to the user equipment, and transmitting said confirmation message from the IP packet gateway to the user equipment.

19. A method according to claim 18, wherein the confirmation message contains identifiers of the authorized services.

20. A method according to claim 18, wherein said confirmation message further contains respective sets of binding information of the authorized services.

21. A method according to claim 11, wherein said reservation message contains information on quality of service for at least one of the requested services.

22. A method according to claim 21, wherein the information on quality of service is bundled with an identifier of the respective service and with a respective set of binding information.

23. A method according to claim 21, wherein said information on quality of service is differentiated services code point and bit rate.

24. A method according to claim 1, wherein a set of binding information defining attributes for a requested service comprises an authorization token to ensure an unique assignment of a request to a respective authorization operation and flow identifiers of flows being carried by a used packet data protocol.

25. A method according to claim 8, wherein said method comprises an initiation of a packet data service instance clearing procedure by the IP packet gateway.

26. A method according to claim 25, wherein the initiation is indicated to a base station by means of a reject code.

27. A method according to claim 26, wherein the base station returns a failure indication to a mobile switching center.

28. A method according to claim 27, wherein the mobile switching center, in response to said failure indication, releases an existing call or initiates negotiation with respect to the call.

29. A system, comprising:
a user equipment; and
an IP packet gateway, the IP packet gateway communicating with an IP network via a policy control interface,
wherein, when the user equipment is requesting at least one service requiring access to the IP network, at the IP packet gateway, a message, which is transmitted from the user equipment to the IP packet gateway, is analyzed in terms of requested services, and authorization of the requested service is checked, said checking comprising determining, whether the requested services are to be authorized in accordance with information from said IP network, and
wherein an error message is sent from the IP packet gateway to the user equipment, when the requested service is not authorized, wherein at least one of the request or the error message includes at least one of policy control information and roaming information, wherein the error message contains at least one identifier of the unauthorized services, a respective set of binding information defining attributes being associated with the requested service, and a respective error code; and
wherein the user equipment generates an update message, when said user equipment receives an error message from the IP packet gateway, to request authorization for previously unauthorized services, wherein said update message contains an identifier of previously unauthorized services and a set of binding information defining new attributes associated with the respective requested services, wherein generating an update message further comprises checking the received error message in terms of error code and identifying a new set of binding information for previously unauthorized services based on the received error code.

30. A system according to claim 29, wherein said IP packet gateway is a packet data serving node.

31. A system according to claim 29, wherein the IP network is an IP multimedia subsystem network.

32. A system according to claim 29, wherein the IP packet gateway is a network element of a code division multiple access network.

33. A system according to claim 29, wherein said policy control interface is the 3rd generation partnership project go interface.

34. An apparatus, comprising:
a requester configured to request at least one service requiring access to an IP network;
a receiver configured to receive an error message sent from an IP packet gateway to the apparatus, when a check of authorization of the requested service performed at the IP packet gateway indicates that the requested service is not authorized, wherein at least one of the request or the error message includes at least one of policy control information and roaming information, wherein the error message contains at least one identifier of the unauthorized services, a respective set of binding information defining attributes being associated with the requested service, and a respective error code; and
a generating unit configured to generate an update message, when said user equipment receives an error message from the IP packet gateway, to request authorization for previously unauthorized services, wherein said update message contains an identifier of previously unauthorized services and a set of binding information defining new attributes associated with the respective requested services, wherein generating an update message further comprises checking the received error message in terms of error code and identifying a new set of binding information for previously unauthorized services based on the received error code.

35. An apparatus according to claim 34, wherein said IP packet gateway is a packet data serving node.

36. An apparatus according to claim 34, further comprising:
a message generator configured to generate reservation messages and update messages.

37. An apparatus according to claim 34, further comprising:
an analyzer configured to analyze messages received from the IP packet gateway.

38. An apparatus according to claim 37, further comprising:
a processor configured to process messages received from the IP packet gateway in accordance with an analyzing result from said analyzer.

39. An apparatus according to claim 36, wherein said message generator operate in accordance with a processing result from said processor.

40. An apparatus according to claim 34, further comprising a transceiver configured to transmit and receive messages being generated in the user equipment to the IP packet gateway and to receive messages from the IP packet gateway.

41. An apparatus, comprising:
a policy control interface configured to communicate with an IP network;
an analyzer configured to analyze messages received from a user equipment in terms of requested services;
a checker configured to check, when the message is requesting at least one service requiring access to the IP network, authorization of the requested service, and including a determiner configured to determine whether a requested service is to be authorized in accordance with information provided from said IP network to said apparatus;
a transmitter configured to send an error message to the user equipment, when the requested service is not authorized, wherein at least one of the request or the error message includes at least one of policy control information and roaming information, wherein the error message contains at least one identifier of the unauthorized services, a respective set of binding information defining attributes being associated with the requested service, and a respective error code; and a generating unit configured to generate an update message, when said user equipment receives an error message from an IP packet gateway, to request authorization for previously unauthorized services, wherein said update message contains an identifier of previously unauthorized services and a set of binding information defining new attributes associated with the respective requested services, wherein generating an update message further comprises checking the received error message in terms of error code and identifying a new set of binding information for previously unauthorized services based on the received error code.

42. An apparatus according to claim 41, wherein the apparatus is a packet data serving node.

43. An apparatus according to claim 41, further comprising:
a message generator configured to generate error messages and confirmation messages.

44. An apparatus according to claim 41, wherein said message generator is configured to operate in accordance with a determining result from the determiner and error code information from said IP network.

45. An apparatus according to claim 41, further comprising:
a transceiver configured to transmit messages being generated in the IP packet gateway to the user equipment and to receive messages from the user equipment.

46. An apparatus, comprising:
requesting means for requesting at least one service requiring access to an IP network; and
receiving means for receiving an error message sent from an IP packet gateway to the apparatus, when a check of authorization of the requested service performed at the IP packet gateway indicates that the requested service is not authorized, wherein at least one of the request or the error message includes at least one of policy control information and roaming information, wherein the error message contains at least one identifier of the unauthorized services, a respective set of binding information defining attributes being associated with the requested service, and a respective error code; and
generating means for generating an update message, when said user equipment receives an error message from the IP packet gateway, to request authorization for previously unauthorized services, wherein said update message contains an identifier of previously unauthorized services and a set of binding information defining new attributes associated with the respective requested services, wherein generating an update message further comprises checking means for checking the received error message in terms of error code and identifying means for identifying a new set of binding information for previously unauthorized services based on the received error code.

47. An apparatus, comprising:
interfacing means for interfacing with an IP network via a policy control interface;
analyzing means for analyzing a message, which is received from a user equipment in terms of requested services, when the message is requesting at least one service requiring access to the IP network;
checking means for checking authorization of the requested service, when the message is requesting at least one service requiring access to the IP network, said checking means comprising determining means for determining whether the requested services are to be authorized in accordance with information provided from said IP network to said apparatus; and
transmitting means for transmitting an error message to the user equipment, when the requested service is not authorized, wherein at least one of the request or the error message includes at least one of policy control information and roaming information, wherein the error message contains at least one identifier of the unauthorized services, a respective set of binding information defining attributes being associated with the requested service, and a respective error code; and
generating means for generating an update message, when said user equipment receives an error message from an IP packet gateway, to request authorization for previously unauthorized services, wherein said update message contains an identifier of previously unauthorized services and a set of binding information defining new attributes associated with the respective requested services, wherein generating an update message further comprises checking means for checking the received error message in terms of error code and identifying means for identifying a new set of binding information for previously unauthorized services based on the received error code.

* * * * *

UNITED STATES PATENT AND TRADEMARK OFFICE
CERTIFICATE OF CORRECTION

PATENT NO. : 7,672,317 B2 Page 1 of 1
APPLICATION NO. : 10/795230
DATED : March 2, 2010
INVENTOR(S) : Gateva et al.

It is certified that error appears in the above-identified patent and that said Letters Patent is hereby corrected as shown below:

On the Title Page, Item 75, Inventors:, delete "Thinh Nguyen Phu" and replace with --Thinh Nguyenphu--.

Signed and Sealed this

Eighteenth Day of May, 2010

David J. Kappos
*Director of the United States Patent and Trademark Office*